United States Patent [19]

Buser et al.

[11] Patent Number: 4,460,424
[45] Date of Patent: Jul. 17, 1984

[54] METHOD OF INTEGRATED OPTICAL SYSTEM

[75] Inventors: Rudolph G. Buser, Wall, N.J.; Neal T. Nomiyama, Reston; Aubrey J. Dunn, Springfield, both of Va.

[73] Assignee: The United States of America as represented by the Secretary of the Army, Washington, D.C.

[21] Appl. No.: 258,167

[22] Filed: Apr. 27, 1981

[51] Int. Cl.³ ............................................. B32B 31/04
[52] U.S. Cl. ................................. 156/242; 156/245; 156/293; 228/164; 228/174; 350/417; 356/350
[58] Field of Search .................. 156/242, 245, 293; 350/417; 356/350; 228/164, 170, 174

[56] References Cited

U.S. PATENT DOCUMENTS

| 2,919,626 | 1/1960 | Bergmann | 350/417 |
| 3,382,758 | 5/1968 | Wang | 356/350 |
| 3,503,688 | 3/1970 | Lechevalier | 356/350 |
| 3,749,479 | 7/1973 | Kempf | 350/417 |
| 3,888,568 | 6/1975 | Norris et al. | 350/417 |
| 4,134,651 | 1/1979 | England | 350/417 |

*Primary Examiner*—Caleb Weston
*Attorney, Agent, or Firm*—Anthony T. Lane; Milton W. Lee; Aubrey J. Dunn

[57] ABSTRACT

A substrate of a dimensionally-stable material is formed with precision made cavities therein for various linear or nonlinear optical elements or electro-optical elements such as lenses, beam splitters, reflectors, detectors, polarizers, Kerr cells, Pockel cells, etc. Various openings are also made in the substrate for function as optical paths or waveguides. The elements are then bonded into their respective cavities by glueing or soldering; the optical system thus formed is sealed in an air-tight housing.

5 Claims, 1 Drawing Figure

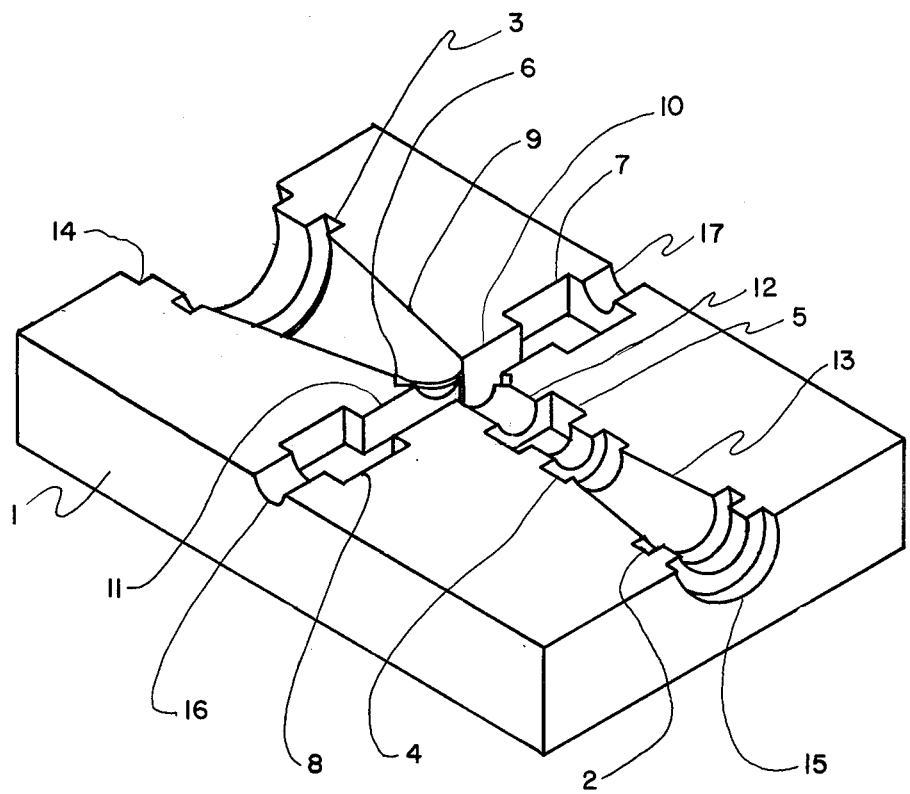

METHOD OF INTEGRATED OPTICAL SYSTEM

The invention described herein may be manufactured, used, and licensed by the U.S. Government for governmental purposes without the payment of any royalties thereon.

BACKGROUND OF THE INVENTION

1. Field of the Invention

This invention is in the field of integrated optical systems such as shown in U.S. Pat. No. 3,503,688 of Mar. 31, 1970. Optical systems may consist of optical elements such as lenses, mirrors, gratings, beam splitters, and prisms; and, in the case of electro-optical systems, may include such elements as lasers any photodetectors. In any event, each such element is usually mounted in its own housing with a base attachment to a common chassis and the elements or bases are adjusted with respect to the chasis and/or each other to define the desired optical path. The chassis may be accessible through a removable cover or panel if element replacement or realignment is necessary. These systems suffer from loss of alignment if subjected to mechanical or thermal shocks and must be realigned by skilled workers. Moreover, the base attachments of the elements require weight and volumn that is undesirable in many applications, such as systems to be used in vehicles. Also, ordinary thermal changes may cause misalignments unless all housings and bases are made of the same material. A typical example of such a system is shown in U.S. Pat. No. 3,382,758 of May 14, 1968. The instant invention produces a system which overcomes these various disadvantages.

SUMMARY OF THE INVENTION

The invention is a method of making an optical system having a plurality of discrete optical elements whereby a substrate is formed with precision cavities and whereby the elements are bonded into the cavities. The substrate is made of a stable homogeneous material with a low coefficient of thermal expansion. A system is thus produced that requires no alignment, that is resistant to thermal and mechanical shocks, that is less subject to misalignments from ordinary thermal changes, and that is lighter and smaller than prior art systems. Moreover, the inventive system is also cheaper to produce than the prior art systems since it requires no alignment and because no individual housings are needed for the various elements.

BRIEF DESCRIPTION OF THE DRAWING

The single drawing FIGURE shows a pictoral view of a substrate for a laser rangefinder made in accordance with the invention.

DESCRIPTION OF PREFERRED EMBODIMENT

The inventive method consists of two primary steps: (1) form substrate with openings for the optical paths or with optical waveguides and with cavities for the various optical elements, and (2) bond the optical elements into their respective cavities. Step (1) may be performed in several different ways; for example, the substrate may be made from a high thermal conductivity thermoplastic material such as BN, BeO, or similar materials cast into a precision mold. Alternately, the substrate may be formed as a slab and the various paths/waveguides and cavities may be machined or otherwise formed therein. Step (2), wherein the elements are bonded into their cavities, may be done by glueing with a high thermal conductivity glue or by soldering (with a low temperature solder) the elements therein.

The drawing FIGURE shows substrate 1 with various cavities 2-8, and with openings 9-13 for the optical path. Cavities 2, 3, and 4 are for lenses, 5 is for a quarter-wave plate, 6 is for a beam splitter, and 7 and 8 are for detectors. The optical system which may be formed on the substrate may act as a modulator for a laser rangefinder, or for other uses. Moreover, cavities 14 and 15 are formed for windows. Also, openings 16 and 17 are provided in 1 for electrical connectors to detectors. The laser for a rangefinder may be mounted to shine into the lens mounted in cavity 3. After all the optical elements are bonded into place, the substrate is sealed by low vapor pressure glue, epoxy, or any other appropriate sealing material (the material would be chosen based on environmental conditions) and is housed in an airtight module designed to meet the particular environmental requirements of the user. For example, if mounted in a tank, the substrate would be mounted in a shock resistant housing; or, if portable, it would be limited to light weight materials such as rigid plastics.

We claim:

1. A method of forming an integrated optical system, with a plurality of optical elements, including the steps of:

(a) forming a substrate with respective cavities for said elements and with optical paths between said elements; and (b) bonding said optical elements into said cavities.

2. The method as set forth in claim 1 wherein step (a) consisting of (1) forming said substrate as a slab, and (2) forming said cavities and paths into said substrate.

3. The method as set forth in claim 1 wherein step (a) consists of (1) casting molten substrate material in a mold, and (2) removing said substrate, when solid, from said mold.

4. The method as set forth in any one of claims 1, 2, or 3 wherein step (b) consists of (1) applying an adhesive to said elements, and (2) inserting said elements into their respective cavities.

5. The method as set forth in any one of claims 1, 2, or 3 wherein step (b) consists of (1) inserting said element into their respective cavities, and (2) soldering said elements to said substrate.

* * * * *